United States Patent [19]

Tanaka et al.

[11] Patent Number: 5,177,731
[45] Date of Patent: Jan. 5, 1993

[54] DISK DRIVE AND PICKUP UNIT FOR AN OPTICAL DISK PLAYER

[75] Inventors: Shinsaku Tanaka; Tadao Arata, both of Tokyo, Japan

[73] Assignee: Tamashim Denki Co, Ltd., Tokyo, Japan

[21] Appl. No.: 651,762

[22] Filed: Feb. 7, 1991

[30] Foreign Application Priority Data

Dec. 21, 1990 [JP] Japan .................. 2-413171

[51] Int. Cl.⁵ ............... G11B 33/02; G11B 23/00
[52] U.S. Cl. .................... 369/77.1; 369/215; 369/264; 369/270; 360/99.12
[58] Field of Search .......... 369/258, 215, 219, 77.2, 369/77.1, 75.2, 270, 271, 264, 266; 360/98.08, 98.12, 104, 105, 106

[56] References Cited

U.S. PATENT DOCUMENTS

| | | | |
|---|---|---|---|
| 4,755,978 | 7/1988 | Takizawa et al. | 369/37 |
| 4,829,508 | 5/1989 | Arita | 369/215 |
| 4,839,764 | 6/1989 | Ikedo et al. | 360/98.08 |
| 4,947,481 | 8/1990 | Ikedo et al. | 369/223 X |

Primary Examiner—Eugene R. LaRoche
Assistant Examiner—Tan Nguyen
Attorney, Agent, or Firm—Lieberman Rudolph & Nowak

[57] ABSTRACT

The inventive reproducing and driving unit of a device for reproducing the data recorded in a disk record reduces the height and weight of the device and the power consumption for moving the turntable and pickup, and prevents the pickup from receiving excessive shock. The reproducing and driving unit comprises a support plate (1), a motor (2) fixedly arranged in the support plate, a turntable (4) axially moveable on the shaft (24) of the motor, and a common moveable link member (28) for reciprocally moving relative to the support plate (1) so as to cause the turntable (4) and pickup (5) to be taken nearer to and away from disk record (29).

4 Claims, 8 Drawing Sheets

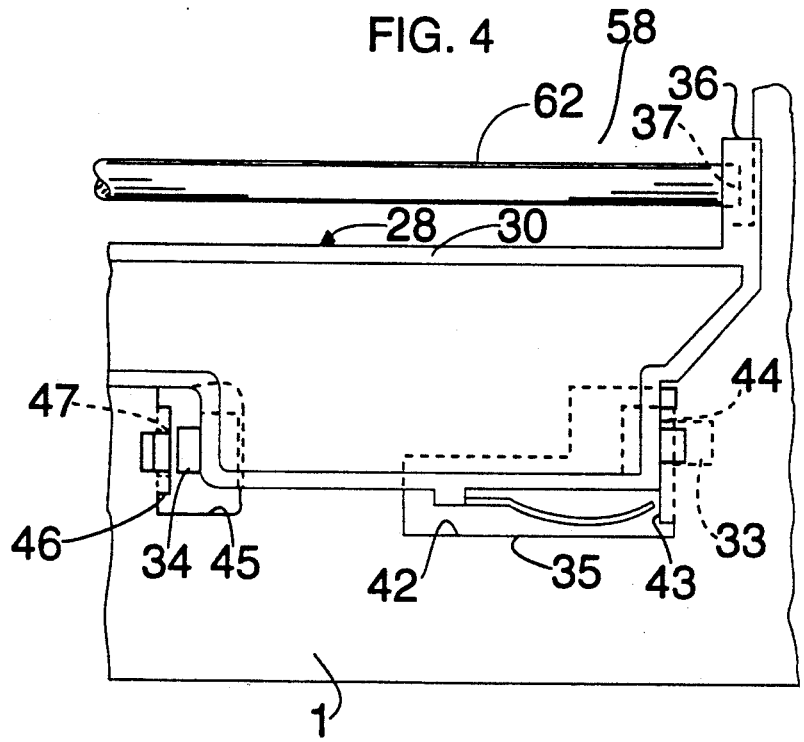
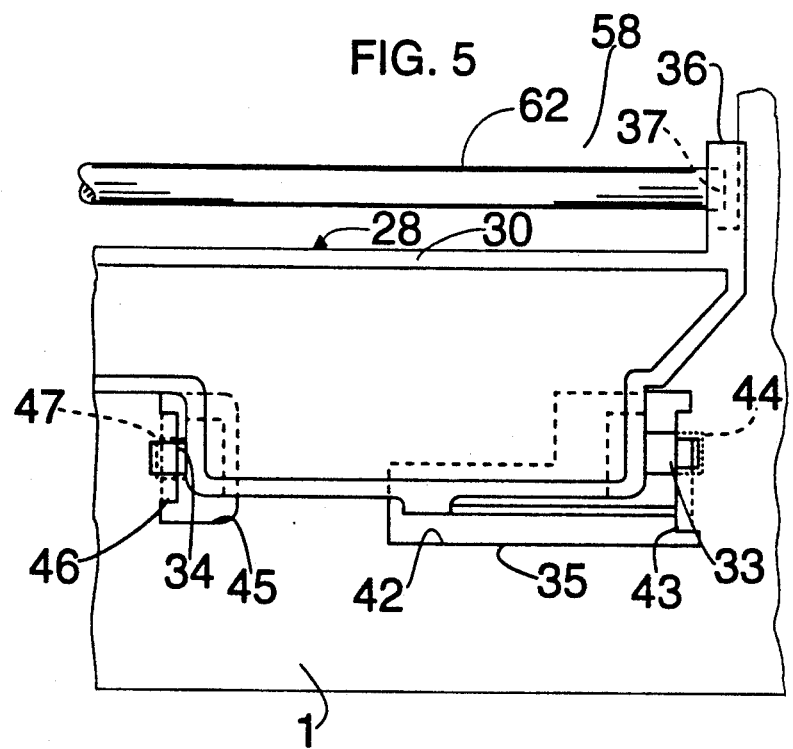

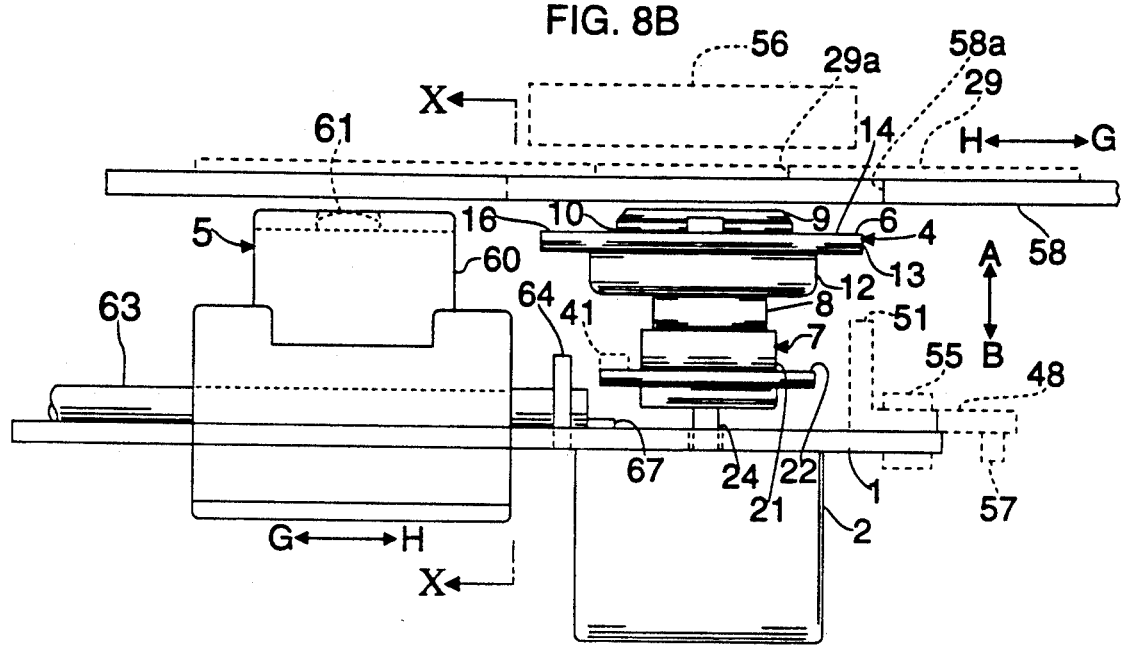
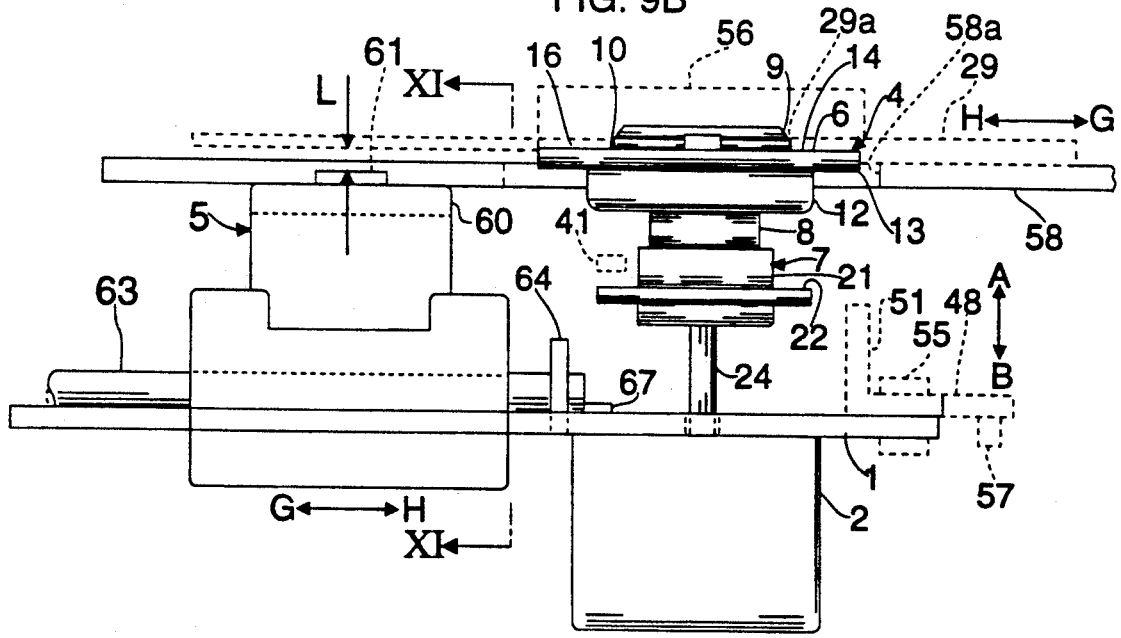

DISK DRIVE AND PICKUP UNIT FOR AN OPTICAL DISK PLAYER

BACKGROUND OF THE INVENTION

The present invention relates to a disk drive and pickup unit for an optical disk player, such as a compact disk (CD) player.

There is disclosed in Japanese Laid-Open Utility Model Publication No. Sho 63-52163 a device for reproducing the data recorded in a disk record comprising a turntable mounted on the shaft of a motor, a clamper, and a pickup. The turntable is rotated with the disk record held between the turntable, and the clamper and the pickup are substantially radially moved relative to the disk during the reading of the disk. In such a conventional device, the turntable, motor and pickup are mounted as a unit on a separate support plate, which in turn is mounted on a main frame with anti-shock materials interposed therebetween.

In reproducing mode, the gap between the disk and pickup is maintained constant, so that the height of the turntable relative to the pickup is fixed.

in a conventional reproducing and driving unit, the support plate should be moved upward and downward, so that the motor is positioned lower in the nonreproducing mode than in the reproducing mode. Hence, the height of the reproducing device must have a value great enough to allow the downward movement of the motor, thus limiting the amount of height reduction. Moreover, since the entire reproducing and driving unit including the motor should be moved, power consumption is relatively great, and the pickup may be liable to excessive shock.

SUMMARY OF THE INVENTION

The object of the present invention is to provide a reproducing and driving unit for reproducing the data recorded in a disk record, which reduces the height and weight of the device, minimizes the number of the parts moved upward and downward, reduces the power consumption, and prevents the pickup from receiving excessive shock.

According to the present invention, there is provided a reproducing and driving unit of a device for reproducing the data recorded in a disk record comprising a turntable mounted on the shaft of a motor, a clamper, and a pickup. A disk record is disposed between the turntable and clamper so as to be clamped therebetween by moving the turntable toward the clamper, with the pickup being moved substantially radially to the disk record, the reproducing and driving unit comprising a support plate, the motor being fixedly arranged in said support plate, the turntable being axially moveable on the shaft of the motor, and a common moveable link member for reciprocally moving relative to the support plate so as to bring the turntable and pickup together toward the disk during a reproduction mode and away from the disk during a non-reproduction mode.

It is preferable that the pickup is moved along two parallel guide rods that are fixedly attached respectively to the movable link member and support plate, so that the pickup may be pivoted about the guide rod. As the movable link member reciprocates, the turntable is moved along the shaft of the motor as it approaches or moves away from the surface of the disk record.

The present invention will now be described more specifically by reference to the drawings, which are provided to serve as examples, but are not to be construed as limiting.

BRIEF DESCRIPTION OF THE DRAWINGS

FIG. 4 is a partly cut-away plane view illustrating the steps of mounting the moveable link member on the support plate;

FIG. 5 is a partly cut-away plane view illustrating the moveable link member mounted on the support plate;

FIG. 8B is a view taken in the direction of the arrow VIIIB of FIG. 8A;

FIG. 9B is a view taken in the direction of the arrow IXB of FIG. 9A;

DETAILED DESCRIPTION OF THE INVENTION

Figure 1:
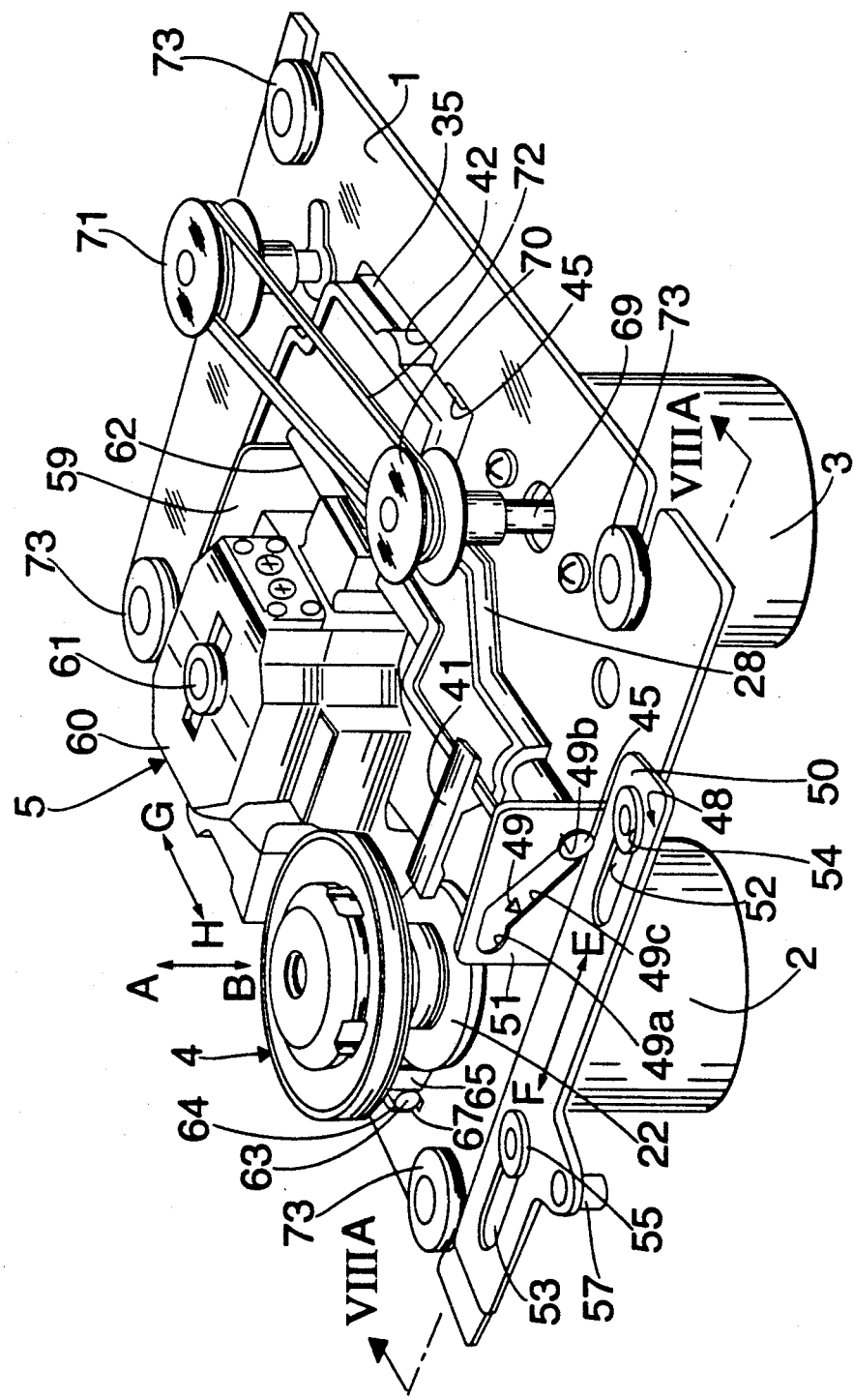
FIG. 1 is a perspective view of a reproducing and driving unit of a device for reproducing the data recorded in a disk record according to one embodiment of the present invention.

Referring to FIG. 1, there is shown a support plate 1 having first and second motors 2 and 3 fixed on the underside thereof. The first motor 2 is to rotate a turntable 4, while the second motor 3 is to move a pickup 5 along guide rods 62, 63.

Figure 2:
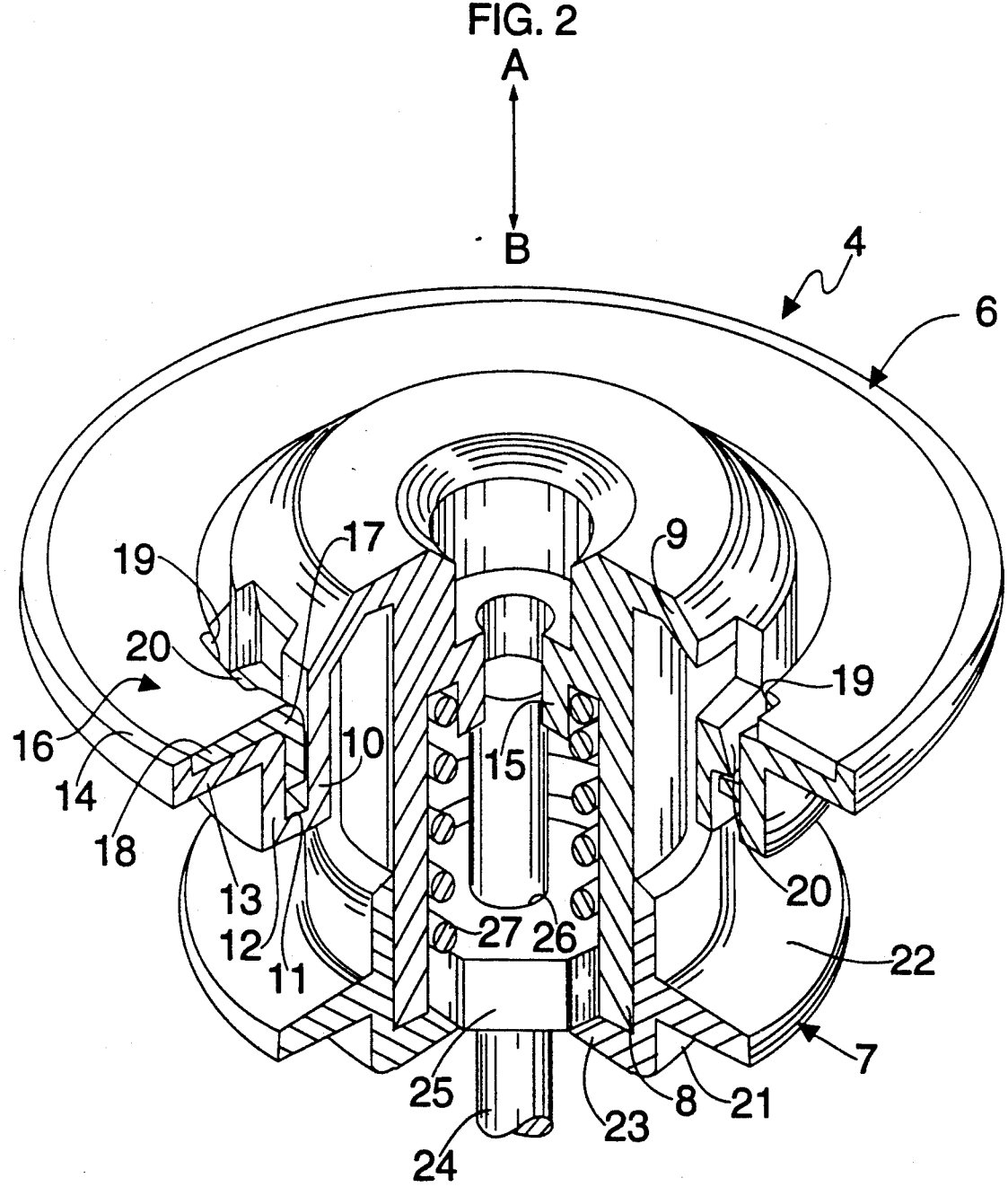
FIG. 2 is a partially cut away perspective view of turntable of the reproducing and driving unit of the present invention.

The turntable 4 comprises a main body 6 and subordinate body 7 as shown in FIG. 2. The main body 6 comprises (i) a cylindrical portion 8 with its upper and lower ends opened (ii) annular slanting wall portion 9 formed downward integrally with the outer edge of the upper end of the cylindrical portion, (iii) first annular vertical wall portion 10 extended downward from the outer edge of the annular slanting wall portion 9, the length of the first annular vertical wall portion 10 being equal to half of that of the cylindrical portion 8, (iv) first annular horizontal wall portion 11 of narrow width formed integrally with the lower end of the first annular vertical wall portion 10, (v) second annular vertical wall portion 12 extended upward from the outer edge of the first horizontal wall portion 11, the length of the second annular vertical wall portion 12 being equal to half of that of the first annular vertical wall portion 10, (iv) second annular horizontal wall portion 13 extended outward from the upper edge of the second annular vertical wall portion 12, the width of the second annular horizontal wall portion 13 being greater than that of the first annular horizontal wall portion 11, (vii) third annular vertical wall portion 14 of low height extended upward from the outer edge of the second annular horizontal wall portion 13, and (viii) fourth annular vertical wall portion 15 of short length extended downward from the upper inner edge of the cylindrical portion 8. The periphery of the inner surface of the cylindrical portion 8 is noncircular for example, hexagonal. Also there is attached a magnetic body 16 on the second annular horizontal wall portion 13. The magnetic body 16 consists of an annular horizontal wall portion 18 extended from the upper end of an annular vertical wall portion 17. A plurality (e.g., three) of engaging apertures 19 are formed in the annular vertical wall portion 17 of the magnetic body 16 with a same interval in the peripheral direction. There are also formed on the outside of the first annular vertical wall portion 10 of the main body 6 a plurality of engaging protuberances 20 corresponding to the engaging apertures 19. The annular vertical wall portion 17 of the magnetic body 16 is pushed downward relative to the inner surface of the second annular vertical wall portion 12 of the main body 6 so that the engaging protuberances 20 resiliently engage the corresponding engaging apertures 19, thus preventing the magnetic body 16 from being inadvertently detached from the main body 6. The subordinate body 7 is made of a synthetic resin, and comprises a cylindrical portion 21 with a bottom and an annular horizontal wall portion 22 formed integrally with an outside portion thereof positioned substantially around the half line of the cylindrical portion 21. The bottom 23 of the cylindrical portion of the subordinate body 7 has a central shaft hole that is not shown. The lower part of the cylindrical portion 8 of the main body 6 is fitted into the inside of the cylindrical portion 21 of the subordinate body 7.

The turntable 4 thus constructed is mounted on the rotating shaft 24 of the first motor 2 protruding from the upper side of the support plate 1 so as to be moved along the shaft (in the direction of the arrow A, B shown in FIGS. 1, 2, 8 and 9). Namely, the shaft 24 is inserted in the central shaft hole of the bottom 23 of the cylindrical portion 21 of the subordinate body 7. In addition, a guide member 25 of the shape corresponding to that of the inside surface of the cylindrical portion 8 of the main body 6 is engaged with the rotating shaft 24 through its central hole 26. The guide member 25 is fixed on the rotating shaft 24 by means of screw, etc. not so as to be moved in the directions of the shaft and circumference. A coil spring 27 is inserted in the cylindrical portion 8 of the main body 6 so as to be interposed between the upper end of the cylindrical portion 8 and the guide member 25. The upper end of the coil spring 27 is interposed between the inside of the cylindrical portion 8 and the fourth annular vertical wall 15, while the lower end thereof abuts the upper end of the guide member 25. The upper end of the rotating shaft 24 is slidably inserted in the inside of the fourth annular vertical wall 15. The turntable is not rotated relative to the rotating shaft 24 because the inside of the cylindrical portion 8 of the main body 6 fixedly engages the guide member 25. The coil spring 27 urges the turntable 4 upward to the limit where the bottom 23 of the cylindrical portion 21 of the subordinate body 7 abuts the guide member 23.

Figure 3:
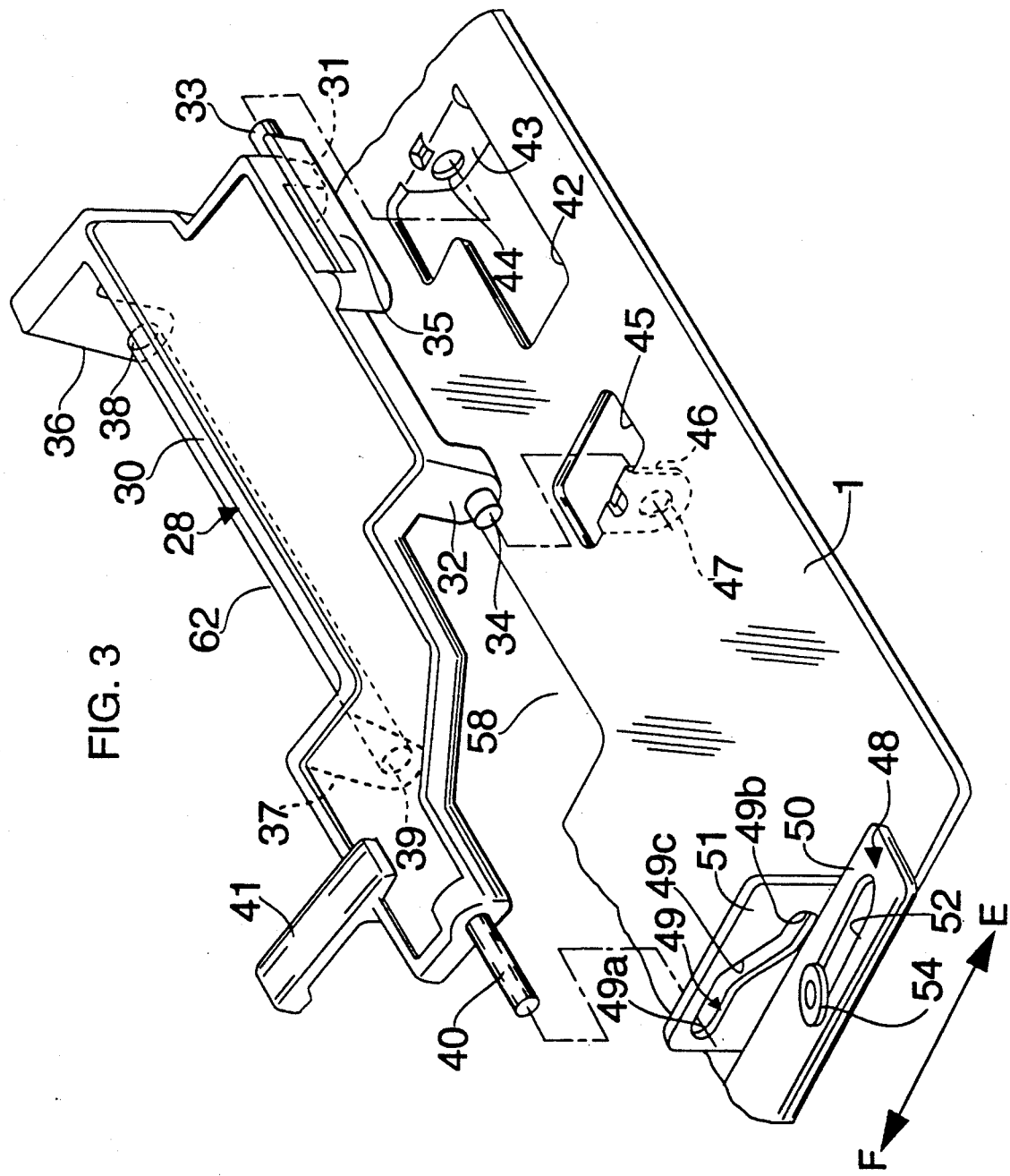
FIG. 3 is an exploded perspective view of the moveable link member being mounted on the support plate of the inventive reproducing and driving unit.
Figure 6:
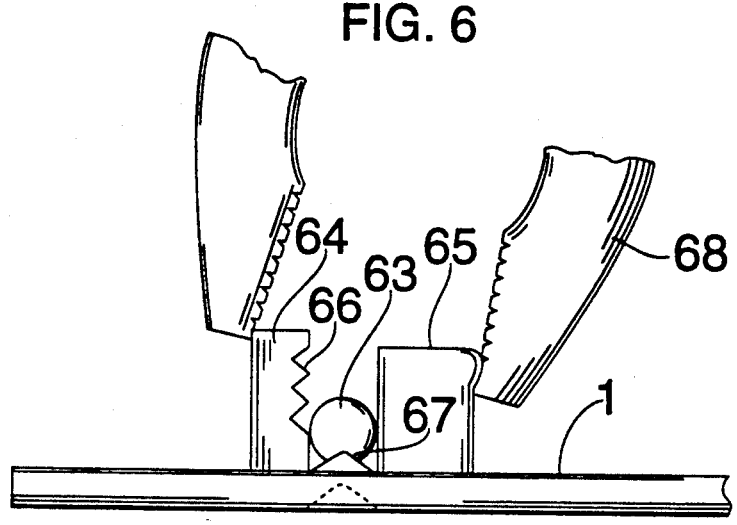
FIG. 6 is a side elevation of the unit illustrating a guide rod being held between a pair of lugs.

The turntable 4 can move to approach and withdraw from the underside of the disk record 29 due to the pivoting motion of the moveable link member 28, which comprises a platelike body 30 of a synthetic resin as shown in FIG. 3. Both ends of the one side edge of the platelike body 30 integrally have a respective downward lug 31, 32 with an integral shaft 33, 34. A resilient strip 35 is formed integrally with and parallel to the one side edge of the platelike body 30 with its one end connected to about the central portion of the one side edge. The other end of the resilient strip 35 is projected over one end of the one side edge. Also both ends of the other side edge of the platelike body 30 integrally have a respective downward projection 36, 37 with a shaft hole 38, 39. A cam engaging shaft 40 is formed integrally with one end portion of the other side edge. A push strip 41 is formed integrally with the one end portion of the other side edge in a direction perpendicular to the shafts 33, 34.

The moveable link member 28 is pivotably mounted on the support plate 1. Namely, as shown in FIG. 4, the shaft 33 is rotatably engaged with a shaft hole 44 of a first downward projection 43 formed on the underside of the support plate 1 through a first opening 42 of the support plate 1. At this time the moveable link member 28 is urged toward one end (rightwise in FIG. 4) so that the resilient strip 35 is bent with its outer end contacting the projection 43. Then, the other shaft 34 (left in FIG. 4) may be rotatably engaged with a shaft hole 47 of a second downward projection 46 formed on the underside of the support plate 1 through a second opening 45 by the resilient force of the resilent strip 35 released. Thus, the moveable link member 28 may be pivoted upward and downward (in the direction of arrow C,D in FIGS. 8A, 9A and 11) around the shafts 33, 34 of the support plate 1 within a given angle.

The cam engaging shaft 40 is slidably engaged with a cam groove 49 of a slide member 48 slidably mounted on the support plate 1. The slide member 48 slides in the direction perpendicular to the pivoting axis of the moveable link member 28, i.e., in the direction of arrow E-F in FIGS. 1, 3, 8A and 9A. The slide member 48 consists of an elongated strip 50 and a vertical wall 51 integrally extended from one side edge thereof. The elongated strip 50 has elongated apertures 52, 53 near both end portions thereof, which are slidably engaged respectively with mounting shafts 54, 55 of the support plate 1. The cam groove 49 consists of a slanting portion 49c connecting a high end 49a and low end 49b. Thus, as the slide member 48 slides in the direction of arrow E-F, the cam groove 49 causes the moveable link member 28 to be pivoted in the direction of arrow C-D. If the moveable link member 28 is pivoted downward in the direction of arrow D, the push strip 41 pushes downward the annular horizontal wall portion 22 of the subordinate body 7 of the turntable 4 so that the turntable 4 is moved downward in the direction of arrow B against the resilient force of the coil spring 27 so as to freely move a disk tray 58. Alternatively if the moveable link member 28 is pivoted upward in the direction of arrow C, the turntable 4 is released from the push strip 41 so as to be moved upward in the direction of arrow A by the resilient force of the coil spring 27, so that the magnetic body 16 contacts through a disk record a magnet (not shown) of the clamper 56 arranged at a given position over the turntable (see FIG. 9). The slide member 48 is linked to a drive mechanism (not shown) by means of a connecting pin 57 projected from one edge portion thereof. Reproducing and ejecting operation causes the drive mechanism to move the slide member 48 in the direction of arrow E-F.

The pickup 5 is disposed in a third opening 59 of the support plate 1 so as to be moved in the direction parallel with the pivoting axis of the moveable link member 28, i.e., substantially in the radial direction of the disk record 29 (in the direction of arrow G-H in FIGS. 1, 8B and 9B). The pickup body 60 has a lens part 61 on the upper side thereof, and is moveably and pivotably mounted on the guide rods 62, 63 that are parallel with the pivoting axis of the moveable link member 28 and are received by the holes 60a, 60b formed in both sides of the pickup body. Both ends of the guide rod 62 are respectively engaged with the shaft holes 38, 39 of the two projections 36, 37 of the moveable link member 28, while the other guide rod 63 is held between a pair of lugs 64 and 65 projected from the upper surface of the support plate 1 adjacent to opposite edges of the opening 59 (see FIGS. 1, 6 to 11). One lug 64 is narrower in width than the other lug 65, so that the one lug 64 may be bent more easily than the other lug 65. Moreover, the one lug 64 has a sawtooth edge 66 toward the other lug 65.

Figure 7:
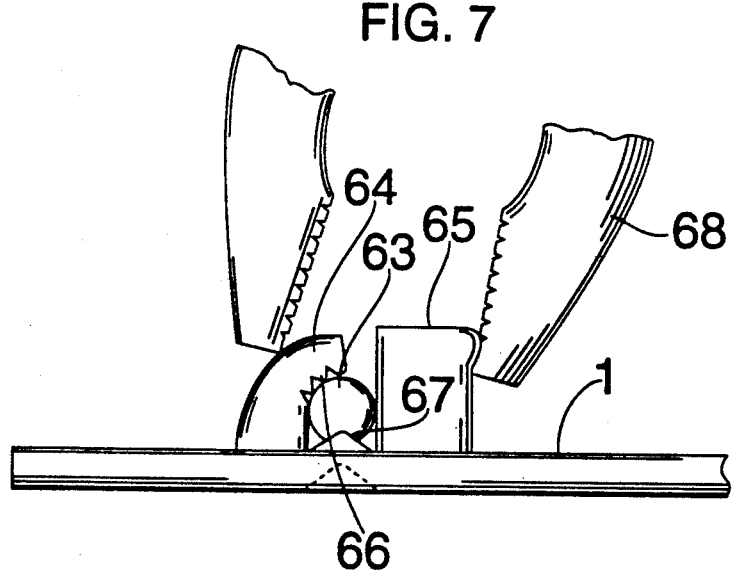
FIG. 7 is a side elevation of the unit illustrating the guide rod firmly held between the pair of lugs.
Figure 8A:
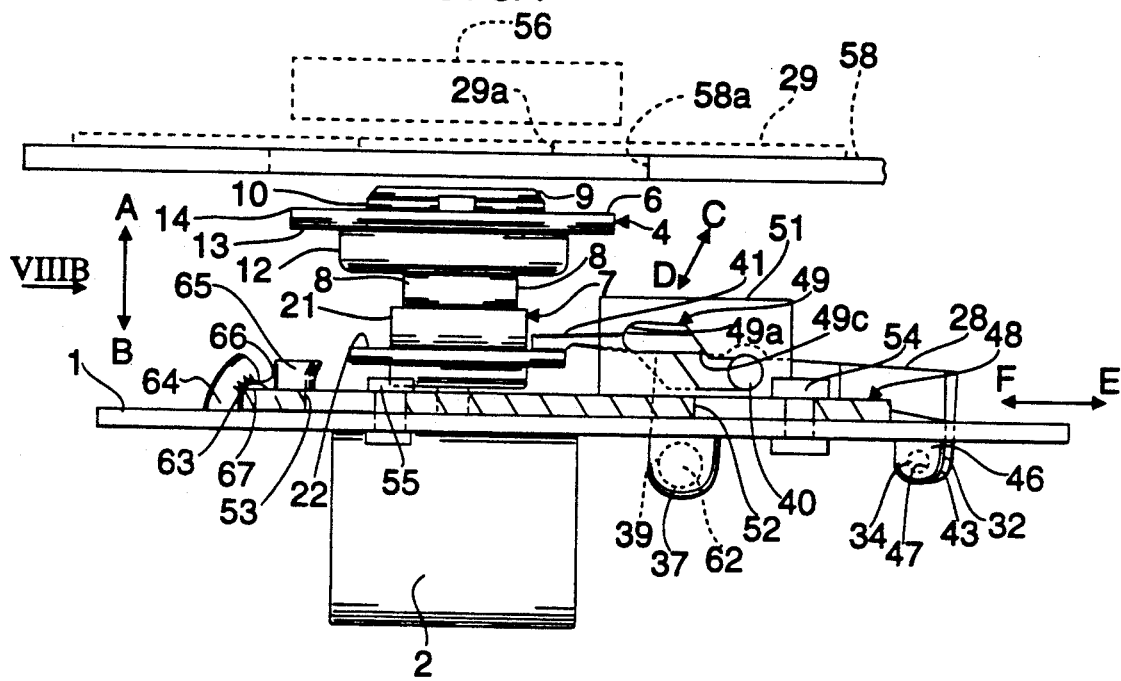
FIG. 8A is a cross sectional view taken along line VIIIA—VIIIA of FIG. 1.
Figure 9A:
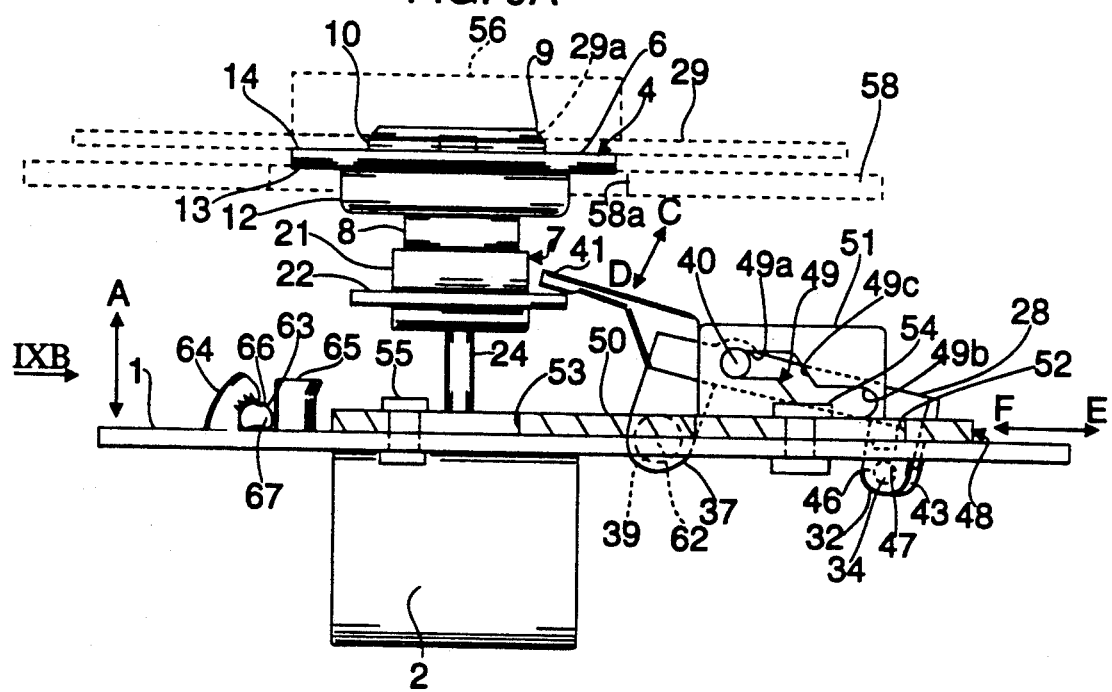
FIG. 9A is a view similar to FIG. 8A in reproducing mode.

An inverted V-shaped projection 67 is projected from a portion of the upper surface of the support plate 1 adjacent to the portion between the lugs 64 and 65. Both ends of the guide rod 63 abut the projections so as to fix the direction of the guide rod 63. The pair of lugs 64 and 65 with an end portion of the guide rod 63 positioned between them are pressed toward each other by a pliers 68 so as to bend the lug 64 around the guide rod 63, so that the sawtooth edge 66 engages the guide rod 63 as shown in FIG. 7. The guide rod 63 is thereby prevented from becoming inadvertently detached from between the lugs 64 and 65.

Figure 11:
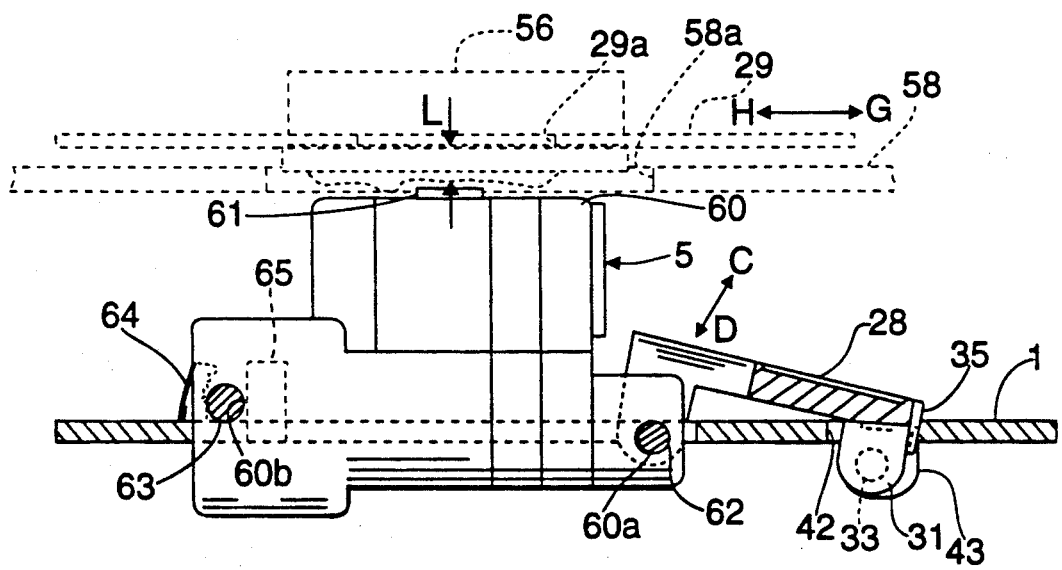
FIG. 11 is a cross sectional view taken along line XI—XI of FIG. 9B.

The rotating shaft 69 of the second motor 3 is projected over the upper surface of the support plate 1, and the projected end of the shaft has a first pulley 70 fixed thereon, as shown in FIG. 1. A second pulley 71 is rotatably mounted on a portion of the upper surface of the support plate 1 opposite to the slide member 48. An endless belt 72 is wound around both pulleys 70 and 71. The rotational force of the second motor 3 is transmitted through the first pulley 70, endless belt 72, second pulley 71 and a transmission (not shown) mounted on the upper side of the support plate 1 to the pickup 5 that is moved along guide rods 62, 63 in the direction of arrow G-H. When the moveable link member 28 is pivoted upward in the direction of arrow C, the upper side of the pickup body 60 is positioned parallel to the underside of the disk record 29 with a gap L between the lens part 61 and the underside of the disk record 29, as shown in FIGS. 9B and 11.

Referring to FIGS. 8 to 11, a disk tray 58 for receiving the disk record 29 is transferred by a loading mechanism (not shown) between reproducing position and nonreproducing position in the same direction as the pickup 5 (in the direction of arrow G-H in FIGS. 1, 8B and 9B). The support plate 1 is mounted on a main frame (not shown) with anti shock materials such as rubber cushion interposed between them.

In operation of the inventive reproducing and driving unit, if the power switch is on to perform the ejecting operation, the disk tray 58 is transferred in the direction of arrow G by means of the loading mechanism (not shown) ejected outside the reproducing device. Then the disk record 29 is placed in the disk tray 58, and the reproducing operation is performed. The disk tray 58 is transferred by the loading mechanism in the direction of arrow H to the inside of the reproducing device, so that the disk record 29 is placed in a given position between the turntable 4 and clamper 56 as shown in FIG. 8. Meanwhile, until the disk record is transferred to the given position, the slide member 48 maintains the moving position in the direction of arrow F, so that the moveable link member 28 is pivoted downward in the direction of arrow B, thus urging the turntable 4 in the direction of B against the resilient force of the coil spring 27.

Thereafter, the loading mechanism moves the slide member 48 in the other direction of arrow E so as to move the cam engaging shaft 40 of the moveable link member 28 from the low end 49b of the cam groove 49 through the slanting portion 49c to the high end 49a thereof, thus pivoting the moveable link member 28 upward in the direction of arrow C. Hence, the turntable 4 is released from the downward pressure of the push strip 41 of the moveable link member 28, and moved upward by the resilient force of the coil spring 27, so that the annular vertical wall portion 10 of the turntable 4 is received by the central hole 29a of the disk record 29 through the opening 58a of the disk tray 58. Subsequently, the disk record 29 is moved upward with its underside abutting the upper surface of the magnetic body 16 of the turntable 4, separated from the disk tray 58, so as to be rotatably clamped between the turntable 4 and clamper 56 as shown in FIG. 9. In this case, the push strip 41 of the moveable link member 28 is separated from the upper surface of the annular horizontal wall portion 22 of the turntable 4 (see FIG. 9). Further, the guide rod 62 is moved upward with the upward pivoting of the moveable link member 28, so that the pickup 5 pivots on the other guide rod 63 positioned as shown in FIGS. 9B and 11, and the lens part 61 approaches the underside of the disk record 29 with a gap L between them. In this position, the turntable 4 is rotated together with the disk record 29, and the pickup 5 is moved in the direction of arrow G outwardly from the center of the disk record 29, so that the data recorded in the disk record 29 is reproduced.

Figure 10:
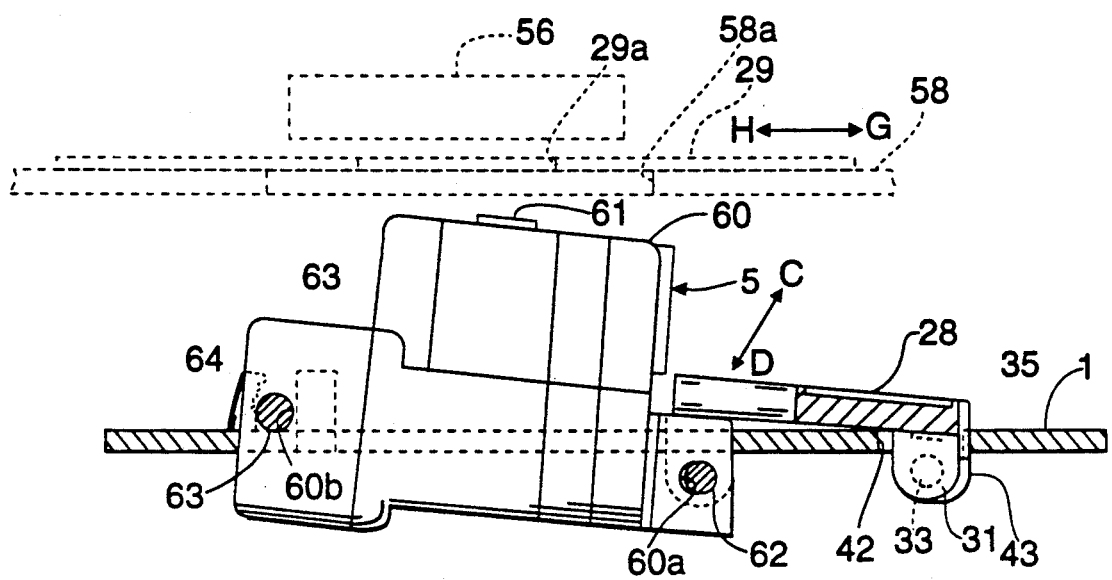
FIG. 10 is a cross sectional view taken along line X—X of FIG. 8B.

In the ejecting operation, the loading mechanism moves the slide member 48 in the direction of arrow F so as to move the cam engaging shaft 40 of the moveable link member 28 from the high end 49a through the slanting portion 49c to the low end 49b, so that the moveable link member 28 is pivoted downward in the direction of arrow D. Accordingly, the push strip 41 of the moveable link member 28 pushes downward on the annular horizontal wall portion 22 of the turntable 4, so that the turntable 4 is moved downward in the direction of arrow B against the resilient force of the coil spring 27, positioned below the underside of the disk tray 58. Hence, the disk record 29 is placed in the disk tray 58 as shown in FIGS. 8 and 10. In addition, the guide rod 62 is pivoted downward on the other guide rod 63, so that the pickup 5 is positioned as shown in FIG. 10. Finally, the loading mechanism moves the disk tray 58 outward in the direction of arrow G so as to take out the disk record 29 from the tray.

As described above, the reproducing and driving unit of the present invention comprises a support plate, a motor fixedly arranged on said support plate, a turntable axially moveable on the shaft of the motor, and a common moveable link member for reciprocally moving relative to the support plate so as to cause the turntable and pickup to be moved nearer to and away from disk record.

Since the support plate and motor are restricted in a fixed position, and the turntable and pickup are only moved upward and downward for operation of the reproducing device, it is possible to reduce the height and weight of the device. Furthermore, the power consumption for operating the device is reduced, and the pickup is prevented from receiving excessive shock.

What is claimed is:

1. A disk drive and pickup unit for an optical disk player, which comprises:
   (a) a support plate;
   (b) a motor fixedly attached to the support plate;
   (c) a shaft rotatably turned by the motor;
   (d) a turntable mounted to be axially movable on the shaft;
   (e) a clamper, the clamper being positioned opposite the turntable so that when a disk is placed on the turntable and the turntable is moved toward the clamper, the clamper secures the disk to the turntable;
   (f) a movable member movably attached to the support plate;
   (g) a first guide member disposed on the movable member parallel to the recording surface of a disk placed on the turntable;
   (h) a second guide member disposed on the support plate parallel to the first guide member; and
   (i) a pickup movable along the first and second guide members, the pickup and the turntable being simultaneously moved toward a disk during a reproduction mode and away from the disk during a non-reproduction mode.

2. A disk drive and pickup unit of claim 1, wherein the motor is attached to the bottom side of the support plate and the movable member is attached to the top side of the support plate.

3. A disk drive and pickup unit of claim 1 further comprising a slide member slidably attached to the support plate, the slide member having a cam groove with an inclined portion formed thereon, the cam grove engaging an engaging shaft located on the movable member with the movable member being rotated by the sliding of the slide member.

4. A disk drive and pickup unit of claim 1 further comprising a spring positioned so as to press the turntable toward the clamper, the movement of the turntable away from the disk during the non-reproduction mode being effected by pressing the turntable with the movable member and the movement of the turntable toward the disk during a reproduction mode being effected by the spring after the pressing of the movable member against the turntable is ended.

* * * * *